United States Patent [19]

Porcina

[11] 4,421,248

[45] Dec. 20, 1983

[54] SECURITY APPARATUS AND METHOD FOR A SELF-SERVICE FUEL PUMPING STATION

[76] Inventor: John R. Porcina, 11799 Lyon Rd., Delta, British Columbia, Canada

[21] Appl. No.: 273,671

[22] Filed: Jun. 15, 1981

[51] Int. Cl.³ ............................................. B67D 5/30
[52] U.S. Cl. ..................................... 222/25; 222/638; 222/23; 377/21
[58] Field of Search .................... 222/23, 25, 26, 27, 222/28, 52, 63, 71, 638, 639, 2; 235/92 FL, 92 CA, 92 CT; 364/479, 510; 340/825.35; 194/5, 13

[56] References Cited

U.S. PATENT DOCUMENTS

| | | | |
|---|---|---|---|
| 2,712,885 | 6/1955 | Winship | 222/26 |
| 2,995,275 | 8/1961 | Brice | 222/26 |
| 3,099,366 | 7/1963 | Reilly | 222/26 X |
| 3,497,107 | 2/1970 | Tatsuno | 222/26 |
| 3,510,630 | 5/1970 | Ryan et al. | 222/26 X |
| 3,949,207 | 4/1976 | Savary et al. | 222/71 |
| 3,982,664 | 9/1976 | Robbins et al. | 222/26 |
| 4,230,937 | 10/1980 | Smilgys | 222/20 |

*Primary Examiner*—Joseph J. Rolla
*Assistant Examiner*—Jan Koniarek
*Attorney, Agent, or Firm*—Hughes, Barnard & Cassidy

[57] ABSTRACT

A self-service station where a number of parties, each having an individual operating key or card, can pump gas from a single pump by inserting the key or card into a matching slot to activate the pump. When the fuel begins to flow to the discharge nozzle, a pulsing device is activated to register on a counter the amount of fuel pumped. To prevent pumping of fuel under circumstances where the pulsing device is not operating, there is a timer that shuts off the pump if the pulsing device does not become operative after a certain period of time. The timer is arranged with a flow responsive switch so that the time period is measured from the time fuel actually begins to flow to the time that the pulsing device starts to operate. This permits the time period to be made relatively short to minimize the pumping of fuel without recording the same on the counter.

13 Claims, 3 Drawing Figures

SECURITY APPARATUS AND METHOD FOR A SELF-SERVICE FUEL PUMPING STATION

BACKGROUND OF THE INVENTION

The present invention relates to self-service fuel pumping stations where the pump can be operated by a number of parties, each of whom has an individual operating key or card.

In recent years, self-service fuel pumping stations have become increasingly popular. Not only is there a savings in that the station does not have to be attended during normal working hours, but there is the advantage that fuel can be made available on a seven day a week, 24 hour basis.

In a typical self-service station, there are a number of subscribers, each of whom has an individual access key or card to operate the fuel pump. The fuel pump itself is provided with a number of key slots, one for each of the subscribers who has access to the station, or a single card reader. When an individual wishes to pump fuel, he first inserts his key or card into the particular key slot which is assigned to him. When he turns the key, power is supplied to the fuel pump to cause it to operate. The person then takes the nozzle to the tank to be filled, inserts the nozzle in the tank opening, and operates the nozzle valve to cause fuel to flow into the tank.

So that there can be an accounting for each subscriber for the fuel he pumps, there is an individual counter or meter for each key slot. Each counter keeps a total of the fuel pumped due to operation of its related key slot and the subscriber is billed periodically in accordance with the reading on the counter.

One of the problems of such self-service stations is the possibility of the person pumping fuel without this being registered on the counter. This generally occurs where there is a malfunctioning of the pulsing device, either through a mechanical or electrical failure of the component or from deliberate tampering with the pulsing device. As a precaution, many self-service stations have the pumping unit equipped with a timer which causes an automatic shut off of the pump if the pulsing device does not operate. This occurs in the following manner. When the person initially inserts his individual key or card to cause the pump to operate, the timing device is triggered. This timing device is also responsive to the pulsing device, and if the timer does not detect the pulses from the pulsing device within a predetermined time period beginning from the insertion of the key or card, the timing device shuts off the pump.

However, the time period from the insertion of the key or card to the sensing of the pulses cannot be made too short. For example, let's take the typical situation where a person might be filling the tank of a vehicle. The person first inserts his key, then takes the nozzle from the pump, walks to the location of the tank opening in the vehicle, loosens the gas cap, and then begins pumping. The present time period of the timing device must allow for the amount of time that it takes to perform the steps. Otherwise the person has the annoyance of the premature shut off. A more serious situation is where the inlet to the tank is possibly on an upper part of the vehicle so that the person must climb on top of the vehicle to fill the tank. Therefore, the timing device is usually made to respond where there is a lapse of about sixty seconds from the delivery of power to the pump and the sensing of the pulses.

Even with the timing device, it is possible for the person to obtain substantial amounts of fuel without this being registered on the counter by "milking" the pump. First, let's assume that the pulsing device in inoperable, either by tampering or accidental failure of some component. The person inserts his key and immediately starts pumping fuel. After about sixty seconds, the timing device shuts off the pump. The person leaves the nozzle in the tank inlet, and removes the key from the slot. After a short period of time during which the timing device automatically resets itself (e.g. about one second), the person again inserts the key into his individual slot and then immediately opens the valve at the nozzle to pump more gas for a period of about sixty seconds. These steps are repeated a number of times until a substantial amount of fuel has been "milked" from the tank, all of this being accomplished without any recording on the counter.

Thus the setting of the timing device is a compromise, and as a practical matter not at all the best compromise. It must be set for a sufficiently long period of time to permit the person to begin pumping fuel without a premature shut off. Yet it is desirable to have it short enough to prevent the "milking". It is to this problem that the present invention is directed.

A search of the patent literature discloses a number of patents relating generally to self-service pumping stations. For example, U.S. Pat. No. 3,099,366, Reilly, discloses a system where there are individual meter read-outs, total meter read-outs, and also meter tickets to be checked against the meter readings. Magnetic counters are activated by electrical pulses. Other systems are shown in U.S. Pat. No. 2,712,885, Winship; U.S. Pat. No. 2,995,275, Brice; and U.S. Pat. No. 3,497,107, Tatsuno.

U.S. Pat. No. 3,510,630, Ryan et al, provides an accounting system for such a self-service station where different types of fuel are taken from different sources at the station.

In view of the foregoing, it is an object of the present invention to provide an apparatus and method to effectively prevent any substantial amount of fuel being taken from the self-service station without this being recorded, and also to permit fuel to be delivered conveniently without premature shut off.

SUMMARY OF THE INVENTION

The apparatus of the present invention is adapted to deliver fluid, such as liquid fuel, at a self-service station where there is a record made of the fuel delivered. The apparatus comprises a pump that pumps fluid from a fluid source to a nozzle means. There is selectively operable switch means to cause the pump to operate and counting means responsive to fluid flow in a manner to record the same. Also, there is flow detecting means to detect fluid flow to the nozzle.

Shut off control means is connected to the flow detecting means and to the counting means so as to detect a condition where the flow detecting means detects flow to the nozzle and the counting means is not operating to record flow. Upon occurrence of such a condition, there is a shut off of fluid flow to the nozzle. Thus, the fluid is not delivered where there is not a recording of the fluid delivered.

Specifically, the shut off control means comprises timing means to detect a time interval extending from a beginning of fluid flow to operation of the counting means. The shut off means shuts off the fluid flow where the time interval exceeds a predetermined time limit. Further, the shut off control means in the specific configuration shown herein comprises a shut off switch to interrupt flow of power to the pump. There is also a flow switch responsive to the detecting means and operatively connected to the timing means in a manner that activation of the flow switch by the flow detecting means initiates operation of the timing means.

As shown herein, the timing means comprises a capacitor arranged to provide a shut off signal at a predetermined voltage level. The flow switch is connected to the capacitor means and to a voltage source to cause the capacitor to be charged to the predetermined voltage level upon operation of the flow switch in response to fluid flow.

There is a capacitor discharge means to reduce the charge on the capacitor. This capacitor discharge means is connected to the counting means to reduce the charge on the capacitor in response to operation of the counting means.

In the method of the present invention, apparatus such as that described above is provided. The method comprises detecting fluid flow to the nozzle, and then detecting operation of the counting means. The fluid flow is shut off under circumstances where fluid flow is detected, but there is not a detection of operation of the counting means.

This is accomplished by initiating operation of a timing device upon detection of fluid flow to the nozzle so as to provide a measure of a time interval beginning with initiation of the fluid flow. At the end of the time interval, the fluid flow is shut off under circumstances where detection of operation of the counting means does not take place before expiration of the time interval.

Specifically, the time interval is provided by charging the capacitor by connecting the capacitor to a voltage source upon detection of fluid flow to the nozzle. The charge on the capacitor is reduced upon detecting of operation of the counting means. However, under circumstances where the capacitor reaches the predetermined voltage level, a shut off signal from the capacitor is initiated to shut off fluid flow to the nozzle.

Other features of the invention will become apparent from the following detailed description.

DESCRIPTION OF THE PREFERRED EMBODIMENT

It is believed that a clearer understanding of the present invention will be attained by first describing the main components of a self-service pumping station, second the automatic shut off system of a typical prior art station, and finally the system of the present invention.

Figure 1:
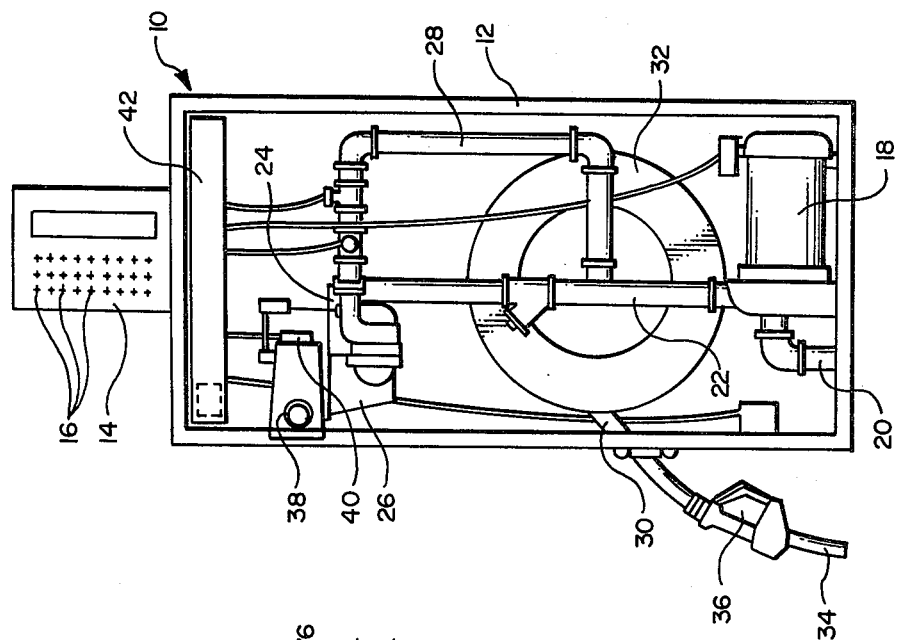
FIG. 1 is a front elevational view of a pumping unit of a pumping station incorporating the present invention.

In FIG. 1, there is shown a single pumping unit 10 suitable for use in the present invention. This comprises a housing structure 12 on top of which is the key lock control panel 14 having a plurality of key slots 16. Located in the lower part of the housing 12 is the pump and motor unit 18. This unit 18 draws in fuel from a supply tank through a line 20 and pumps the fuel upwardly through a second line 22.

The fuel in line 22 passes through a strainer 24, thence through a flow meter 26, and then through a third line 28. The line 28 connects to a hose 30 wound on a reel 32. The discharge end of the hose 30 connects to a nozzle 34 having a manually controlled valve 36.

Connected to the flow meter 26 is a register 38 having therein a rotating element that responds to flow through the meter 26. A pulser 40 is connected to the register 38 in a manner to deliver a pulse for each revolution of the rotating element in the register 38. Thus, the pulses delivered from the pulser 40 are proportional to the volume of flow through the meter 26. The pulser 40 in turn has an operative connection to a junction box 42 that interconnects with the key lock control panel 14.

It is to be understood that all of the components 10-42 described immediately above currently exist in the prior art.

Figure 2:
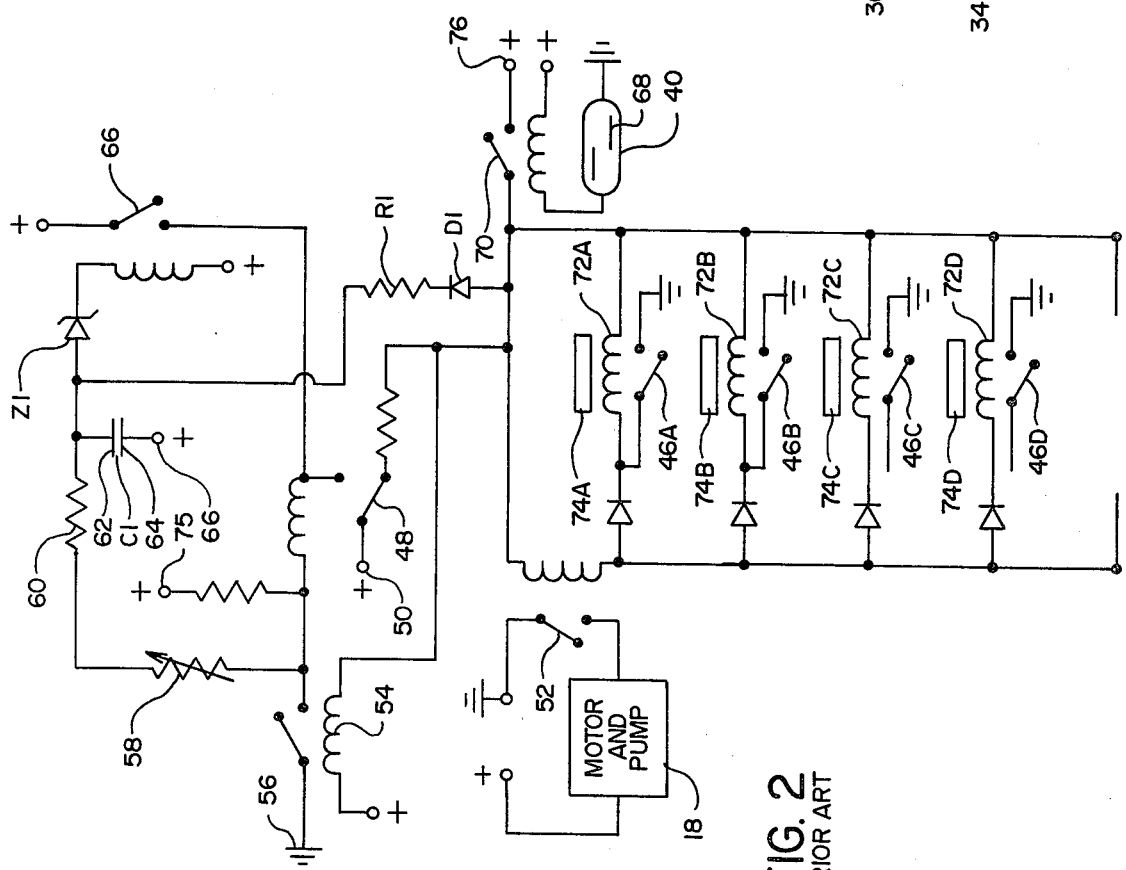
FIG. 2 is a schematic drawing of the apparatus of the present invention.

Reference is now made to FIG. 2 which is a schematic drawing of a circuit to illustrate the operation of the circuitry of a typical self-service pumping station. In the schematic of FIG. 2, for ease of explanation, the various switches, which in the existing apparatus would be transistor components, are shown in FIG. 2 simply as relays.

The individual key lock switches are designated 46, and for purposes of illustration, only four of these key lock switches 46 have been shown herein, these being designated 46A, 46B, 46C and 46D. There is a shut off relay 48 which is normally in the position shown in FIG. 2. When any one of the key lock switches 46A-46D is closed, current flows from the positive voltage source at 50, through the relay contacts 48, to cause the motor relay 52 to close. This in turn delivers power to the motor and pump unit 18 to cause the pump to operate. However, until the nozzle valve 36 is opened, the pump does not actually deliver any fuel. If the pump is a centrifugal pump, the pump simply rotates without delivering fuel. If the pump is a positive displacement pump, the fuel flows through a bypass, and no fuel is delivered.

Also, when any one of the key lock switches 46A-46D is closed, current is caused to flow through the coil of a timing relay 54 to cause it to close. Thus, current flows from the gound terminal 56 through a variable resistor 58, thence through a resistor 60 to charge the upper plate 62 of a capacitor C1— with respect to the lower plate 64 which is connected to a positive voltage source 66.

When the upper plate 62 of the capacitor C1 reaches a predetermined threshold or avalanche voltage, it causes current to flow through a zener diode Z1 to cause current to flow through the coil of a relay 66 and thus cause it to close. This in turn causes current to flow through the coil of the shut off relay 48 and move the switch of the relay 48 to its up position, where the relay 48 remains locked in its upper position as long as the relay contact 54 remains closed. The principal effect of moving the relay 48 to its up position is to interrupt current through the coil of the relay 52 so that the relay contacts 52 open. This shuts off the motor and the pump. As long as the key lock switch 46 remains closed, the shut off relay 48 remains in its up position so that the motor and pump 18 will not operate. However, when the key is removed from the lock so as to open the switch 46, the relay contacts 54 open to de-energize the relay 48 and permit its contacts to move to its bottom position as shown in FIG. 2. Then, one of the key lock switches 46A-46D can again be closed by inserting the appropriate key to close one of the key lock switches 56A–56D to close the power relay 52. However, in accordance with the explanation above, if the charge on the capacitor C1 is permitted to build up to a sufficient level, there will again be a shut off of the motor and pump due to the action of the shut off relay 48. The charge on the capacitor C1 is kept at a sufficiently low level by operation of the pulsing device 40, and this will be described immediately below.

Let it be assumed that one of the key lock switches 46A–46D has been closed to cause the motor and pump 18 to begin operating. Let it further be assumed that very shortly after inserting the key in the lock to close one of the switches 46A–46D, the person begins pumping fuel into his fuel tank. This causes the flow meter 26 to rotate, with each rotation of the flow meter 26 momentarily closing a reed switch 68 for each revolution for the flow meter 26. The flow meter 26 could have, for example, a rotating magnetic element which closes the switch 68 each time it passes in proximity thereto. Each time the reed switch closes, it momentarily closes the relay 70.

Each time the relay 70 is closed momentarily, it accomplishes two things. First, it causes a current pulse to travel through one of the coils 72A–72D which has its related key lock switch 46A–46D closed. This in turn activates the counter 74A ro record the pulse. As indicated previously, the counters 74A–74D are read periodically to determine the amount of fuel delivered by closing a particular key lock so that the individual customer or user could be billed accordingly.

In addition, the momentary closing of the pulsing relay 70 provides a path from the upper plate 62 of the capacitor C1 through a resistor R1, through a diode D1 to the positive terminal 76. The result is that even though the current flow through the variable resistor 58 and resistor 60 begins to charge the upper plate 62, the pulser 40 causes a discharge of the capacitor C1 to the positive terminal 76.

Let us now apply this to the typical situation where the person has inserted the key into one of the slots to close one of the key lock switches 46A–46D. Simultaneously, the motor relay 52 and the relay contacts 54 close so that current is simultaneously delivered to the motor to cause it to turn and current is also delivered through resistor 58 and resistor 60 to charge the capacitor C1. Let it further be assumed that the variable resistor 58 is set so that in approximately sixty seconds the upper plate 62 becomes sufficiently negative (relative to the positively charged lower plate 64) to reach the avalanche voltage of the zener diode Z1 to close the relay 66 and cause the shut off relay 48 to move to its up position. However, prior to the passage of that sixty second interval, the person has begun pumping fuel. Then, the flow through the meter 26 causes the pulsing device 40 to operate to in turn cause periodic momentary closure of the reed switch to cause periodic closure of the pulsing relay 70. This charges the capacitor 62 so that the shut off relay 48 remains in its position shown in FIG. 2. However, when the person finally finishes pumping fuel, the pulses from the pulsing device 40 cease, and the charge on the capacitor C1 begins to build up. This would then cause the shut off relay 48 to operate in the manner described above. At such time that the person removed his key from the slot, the key lock switch 46A–46D (whichever one is closed) now opens. This causes the relay 54 to open, which in turn causes the shut off relay 48 to move to its down position (as shown in FIG. 2). The charge on the capacitor C1 is discharged to the positive terminal 75, and the apparatus is now in a condition to be operated by a subsequent user who would insert his key in the appropriate slot.

As indicated previously, if the pulsing device 40 becomes inoperative for some reason, the apparatus can still be "milked" by pumping fuel during the time interval that it takes to charge the capacitor to the appropriate level. This is done by inserting the key in the slot to close one of the switches 46A–46D and immediately start pumping fuel (within a second or two). After the sixty second interval when the shut off mechanism operates, the person removes his key so that the shut off mechanism is reset, again inserts his key and begins pumping. As indicated previously, it is to be understood that the circuitry described with reference to FIG. 2 is a simplified diagram merely to illustrate the operating principles of the prior art device. The prior art device as it actually exists is shown in FIG. 3, and this will be described immediately below, incorporating the novel features of the present invention.

Figure 3:
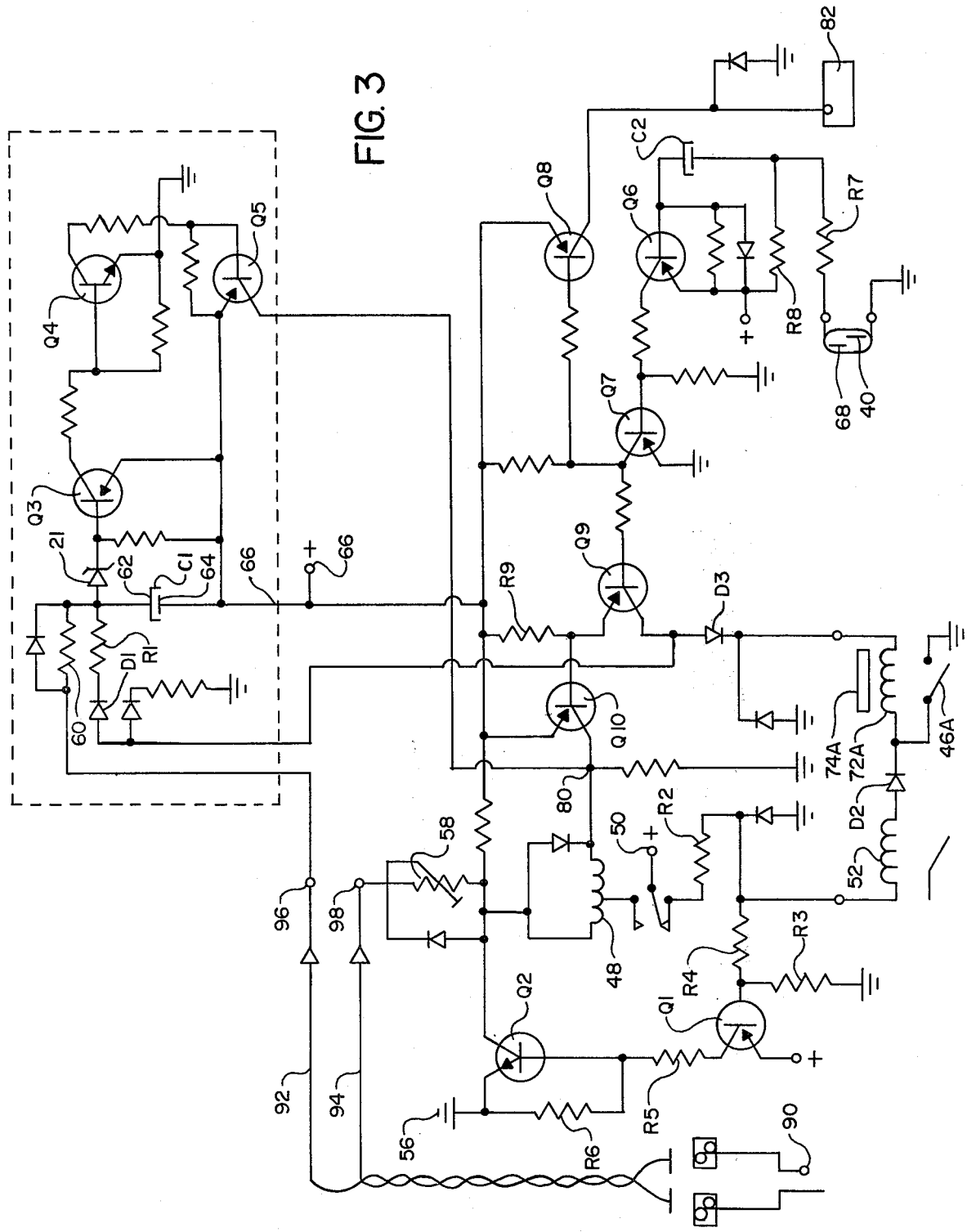
FIG. 3 is a circuit diagram showing the main components of the timer, flow switch and shut off switch.

In describing the components of FIG. 3, there will first be a recitation of the components which correspond closely to those already described in reference to FIG. 2, these being: the power relay 52, the key lock switch 46A, the coil 72A, the counter 74A, the pulsing device 40, the reed switch 68, the capacitor C1, resistor R1 and R2, diode D1, ground terminal 56, variable resistor 58, fixed resistor 60, zener diode Z1, shut off relay 48, positive terminal 50. It is to be understood that the relays 54, 66 and 76 do not exist in the apparatus in FIG. 3, and the functions of those relays 54, 66 and 76 are carried out by transistors. Also, even though only one key lock switch 46A is shown, it is to be understood that a large number of such switches are provided, one for each customer using the self-service pumping system.

When the key lock switch 46A is closed, current flows from the positive terminal 50 through the shut off relay 48, through the twenty-two ohm resistor R2, through the power relay 52, through diode D2 through the key switch 46A to ground, thus causing the motor pump unit 18 to operate. At the same time, current flows through the two voltage dividing resistors R3 and R4 to provide a less positive voltage to be applied to the base of transistor Q1. Transistor Q1 conducts through the two voltage dividing resistors R5 and R6 to apply base current to the transistor Q2 to cause it to be conductive and provide a current path from the ground terminal 56 through the transistor Q2, through the variable resistor 58, through the resistor 66 to begin charging the upper plate of the capacitor C1.

The lower plate 64 of the capacitor C1 is connected to the positive terminal 66, and as the upper plate of the capacitor C1 continues to become charged less positively, it eventually reaches the threshold of avalanche voltage of the zener diode Z1. When the charge on the capacitor C1 becomes sufficiently high, the zener diode conducts to turn on the transistor Q3, which in turn causes transistor Q4 to conduct, which in turn causes transistor Q5 to conduct. Since the emitter of the transistor Q5 is connected to the positive voltage source 66, there is a current path from the collector of the transistor Q5 to the terminal 80, thence through the coil of the shut off relay 48 through the transistor Q2 to the ground terminal at 56.

This causes the switch of the relay 48 to move to its up position (where it remains locked as long as transistor Q2 remains conductive) and shut off the current path through the resistor R2 and through the power relay 52. This in turn permits the power relay 52 to open so as to shut off the motor. With the relay 48 in its up position, and with the transistor Q2 still conducting, current continues to flow through the transistor Q2 and through the relay 48 to keep the relay 48 in its up position (i.e. its shut off position). When the key is removed from the slot to open the switch 46A, the transistor Q2 becomes nonconductive to interrupt current through the relay coil 48 and permit the relay 48 to move to its down position as shown in FIG. 3.

To describe now the operation of the pulsing device 40 and its associated components, each time the reed switch 68 closes, it passes a current pulse through the voltage dividing resistors R7 and R8 to cause a current pulse to travel through the capacitor C2 which is in turn transmitted to the base of the switching transistor Q6. When the transistor Q6 becomes conductive, it transmits base current to the transistor Q7 which sends an amplified signal to the bases of transistors Q8 and Q9. Transistor Q8 is in turn connected to a totalizer 82, which keeps a total of all pulses, so that the total flow of fuel through the system can be recorded. (The totalizer 82 and transistor Q8 are optional features.)

When the transistor Q9 becomes conductive for the duration of the current pulse, it causes a current pulse to travel from the positive voltage source 66 through the low impedance resistor R9 through the diode D3, through the individual counter coil 72A and thence through the key lock switch 46A to ground. This causes the current pulses to be recorded on the counter 74A.

In addition, when the transistor Q9 becomes conductive, the collector terminal of the transistor Q9 reaches a high positive level, rather close to the level of the positive voltage terminal 72, thus for the duration of the pulse, the upper plate of the capacitor C1 discharges through the resistor R1 and diode D1 to the collector terminal of the transistor Q9.

From the above description it becomes apparent that each time the reed switch 68 conducts, it activates the transistors Q6, Q7 and Q9 to cause a current pulse to go to the counter 72. Also, for the duration of the pulse, the upper plate of the capacitor C1 discharges through the collector of the transistor Q9. The transistor Q10 is arranged to be conductive when there is more than one key switch 46A–46D closed. However, since the operation of transistor Q10 is not critical to the present invention, its operation will not be discussed herein.

It is to be emphasized that the components described thus far with reference to FIG. 3 already exist in a typical prior art self-service system. In practice, the variable resistor 58 must be set at a level so that the time period during which the capacitor C1 charges to the shut off level is sufficiently long to prevent premature shut off.

To describe now the components of the present invention, there is provided a flow switch 90 which is made responsive to actual flow of fuel from the motor pump unit 18. This flow switch could be placed, for example, at either of the pipes 22 or 28 in a manner that the switch 90 closes when there is flow through the pipe 22 or 28.

The flow switch 90 is connected through leads 92 and 94 to open terminals 96 and 98 in the line between the variable resistor 58 and the fixed resistor 60. Further, let it be assumed that the variable resistor 58 is moved from a higher resistance setting to a very low resistive setting.

With the flow switch 90 now being inserted between the terminals 96 and 98 as described above, let us again review the operation of the circuitry shown in FIG. 3. Upon closing of the switch 46A, current begins to flow through the path from the terminal 50, through the shut off relay 48, through resistor R2, through the power relay 52, through diode D2, and through switch 46A to ground. The pump immediately begins pumping, but no fuel is yet delivered.

At the same time, upon closing of the switch 46A, the transistors Q1 and Q2 become conductive. However, since the flow switch 90 is open, no current flows from the transistor Q2 through the variable resistor 58. Thus, the capacitor C1 is not being charged.

Let it now be assumed that there is some malfunction in the pulsing device 40, or some malfunction in the transistors Q6, Q7 and Q9, or their associated components, so that pulses are not delivered to the transistor Q9 to make it conductive. In this situation, the power relay 52 shall remain closed for an indefinite period of time, as long as the key lock switch 46A remains closed.

As soon as the fuel valve 36 is opened so that fuel flows through the pipe, two things occur. First, the pulsing device 40 begins transmitting pulses to the transistor Q9. Second, the flow switch 90 closes so as to connect the contacts 96 and 98, so that the capacitor C1 begins to become charged at a preset rate through 58. However, the capacitor C1 does not become charged sufficiently to reach the avalanche voltage of the zener diode Z1 and trigger the shut off mechanism, since the capacitor C1 discharges with each pulse that causes the transistor Q9 to be conductive.

Let us know take a situation where the pulsing device 40 is inoperative for one reason or another, and fuel begins to flow. In this instance, the capacitor C1 is charged with relative rapidity to the avalanche voltage of the zener diode Z1 to trigger the shut off mechanism. This makes it very difficult to "milk" the pump. When the flow valve 36 is opened, there is flow of fuel for about two seconds, after which the capacitor C1 becomes charged and shuts off the pump. The shut off relay 48 remains in the shut off position as long as the key remains in the slot to keep the key lock switch 46A closed. The person then has to remove the key, wait for the shut off mechanism to become reset and then reinsert the key in the slot. When the person can only pump for about two seconds before there is another shut off. The inconvenience and length of time involved is generally sufficient to dissuade most people from attempting to "milk" the pump.

On the other hand, let's take the situation where the person places his key in the slot and is then rather slow in beginning to pump the fuel. Since the flow switch 90 remains open, the capacitor C1 is not being charged. Thus, even if the person is delayed to an unusual extent before beginning to pump fuel, he does not have the inconvenience of the premature shut off. Yet if that person attempts to "milk" the pump, the shut off mechanism reacts rapidly enough to shut down the pump very quickly.

I claim:

1. An apparatus adapted to deliver fluid, such as liquid fuel, at a self-service station where there is a record made of fluid delivered, said apparatus comprising:
   (a) a pump to pump fluid from a fluid source;
   (b) a nozzle means to receive fluid from said pump;

(c) selectively operable switch means to cause said pump to operate;

(d) counting means responsive to fluid flow and operable to record the same;

(e) flow detecting means to detect fluid flow to said nozzle;

(f) shut off control means operatively connected to said flow detecting means and to said counting means to detect a condition where said flow detecting means detects flow to said nozzle and said counting means is not operating to record flow, and to shut off fluid flow to said nozzle upon occurrence of said condition, said shut off control means comprising timing means to initiate a timing cycle and to detect a time interval extending from a beginning of fluid flow to operation of said counting means, with said shut off means shutting off fluid flow where said time interval exceeds said timing cycle.

2. The apparatus as recited in claim 1, wherein said shut off control means comprises a shut off switch to interrupt flow of power to said pump, and further comprising a flow switch responsive to said flow detecting means and operatively connected to said timing means in a manner that activation of said flow switch by said flow detecting means initiates operation of said timing means.

3. The apparatus as recited in claim 2, wherein said timing means comprises a capacitor means arranged to provide a shut off signal at a predetermined voltage level, said flow switch being operatively connected to said capacitor means and to a voltage source to cause said capacitor means to be charged to said predetermined voltage level from said voltage source upon operation of said flow switch in response to fluid flow.

4. The apparatus as recited in claim 3, further comprising capacitor discharge means to reduce a charge on said capacitor, said capacitor discharge means being operatively connected to said counting means to reduce the charge on said capacitor in response to operation of said counting means.

5. In a self-service fluid pumping station where there is:

(a) a pump to pump fluid from a fluid source;
(b) a nozzle means to receive fluid from said pump;
(c) selectively operable switch means to cause said pump to operate;
(d) counting means responsive to fluid flow and operable to record the same;
(e) shut off control means comprising timing means operatively connected to said switch means to initiate a timing cycle upon operation of said switch means; and operatively connected to said counting means to receive a counting signal indicating operation of said counting means;
(f) said shut off control means transmitting a shut off signal to shut off flow from said pump upon completion of said timing cycle without reception of said counting signal;

an improvement comprising:

(a) flow detecting means to detect fluid flow through said nozzle;
(b) circuit means operatively connected to said flow detecting means and to said shut off control means to initiate said timing cycle of the shut off control means upon said flow detecting means responding to said fluid flow.

6. The apparatus as recited in claim 5, wherein said circuit means comprises a switch that closes to initiate current flow to said shut off control means and initiate the timing cycle.

7. A method of delivering a fluid at a self-service pumping station in a manner to prevent pumping of fluid without an accounting for the fluid pumped, where said station comprises:

(a) a pump to pump fluid from a fluid source;
(b) a nozzle means to receive fluid from said pump;
(c) selectively operable switch means to cause said pump to operate;
(d) counting means responsive to fluid flow and operable to record the same;

said method comprising:

(a) detecting fluid flow to said nozzle;
(b) detecting operation of said counting means;
(c) shutting off said fluid flow under circumstances where fluid flow is detected and there is not detection of operation of said counting means;
(d) said method further comprising initiating operation of a timing device upon detection of fluid flow to said nozzle so as to provide a measure of a time interval beginning with initiation of said fluid flow, then at the end of said time interval, shutting off said fluid flow under circumstances where detection of operation of the counting means does not take place before expiration of the time interval.

8. A method of delivering a fluid at a self-service pumping station in a manner to prevent pumping of fluid without an accounting for the fluid pumped, where said station comprises:

(a) a pump to pump fluid from a fluid source,
(b) a nozzle means to receive fluid from said pump,
(c) selectively operable switch means to cause said pump to operate,
(d) counting means responsive to fluid flow and operable to record the same, said method comprising:

(a) detecting fluid flow to said nozzle,
(b) upon detection of said fluid flow, closing a switch to begin charging a capacitor means to build a charge on the capacitor toward a predetermined voltage level,
(c) providing a discharge path from said capacitor to reduce the charge on the capacitor,
(d) activating said discharge path in response to detecting operation of said counter means,
(e) upon said capacitor means reaching said predetermined voltage level, initiating a shut-off signal to shut off fluid flow to said nozzle.

9. An apparatus adapted to deliver fluid, such as liquid fuel, at a self-service station where there is a record made of fluid delivered, said apparatus comprising:

(a) a pump to pump fluid from a fluid source;
(b) a nozzle means to receive fluid from said pump;
(c) selectively operable switch means to cause said pump to operate;
(d) counting means responsive to fluid flow and operable to record the same;
(e) flow detecting means to detect fluid flow to said nozzle;
(f) shut off control means operatively connected to said flow detecting means and to said counting means to detect a condition where said flow detecting means detects flow to said nozzle and said counting means is not operating to record flow, and to shut off fluid flow to said nozzle upon occurrence of said condition, said shut off control means comprising:

(1) a flow switch means responsive to said flow detecting means;
(2) a shut off switch means arranged to interrupt flow of power to said pump;
(3) timing means responsive to operation of said flow switch means in response to fluid flow to initiate detection of a predetermined time interval;
(4) first signal means operatively connected between said counting means and said timing means to transmit a timing signal to said timing means upon activation of said counting means;
(5) said timing means being arranged to respond to said flow switch means and said timing signal to transmit a shut off signal to said shut off switch in response to detecting a time interval exceeding said predetermined time interval between activation of said flow switch and receiving said timing signal from the timing signal means.

10. An apparatus adapted to deliver fluid, such as liquid fuel, at a self-service station where there is a record made of fluid delivered, said apparatus comprising:
(a) a pump to pump fluid from a fluid source;
(b) a nozzle means to receive fluid from said pump;
(c) selectively operable switch means to cause said pump to operate;
(d) counting means responsive to fluid flow and operable to record the same;
(e) flow detecting means to detect fluid flow to said nozzle;
(f) shut off control means operatively connected to said flow detecting means and to said counting means to detect a condition where said flow detecting means detects flow to said nozzle and said counting means is not operating to record flow, and to shut off fluid flow to said nozzle upon occurrence of said condition, said shut off control means comprising:
(1) a capacitor means arranged to provide a shut off signal at a predetermined voltage level of said capacitor;
(2) flow switch means operatively connected between said capacitor means and a voltage source to charge said capacitor at a predetermined rate upon activation of said flow switch means in response to said fluid flow detecting means;
(3) capacitor discharge means operatively connected between said counting means and said capacitor means to discharge said capacitor upon operation of said counting means to below said predetermined voltage level;
(4) a shut off switch operatively connected to said capacitor means to respond to said shut off signal to shut off flow from said pump.

11. In a self-service fluid pumping station where there is:
(a) a pump to pump fluid from a fluid source;
(b) a nozzle means to receive fluid from said pump;
(c) selectively operable switch means to cause said pump to operate;
(d) counting means responsive to fluid flow and operable to record the same;
(e) shut off means comprising timing means operatively connected to said switch means to initiate a timing cycle upon operation of said switch means, and operatively connected to said counting means to receive a counting signal indicating operation of said counting means, said shut off control means comprising:
(1) a capacitor means arranged to provide a shut off signal at a predetermined voltage level of said capacitor;
(2) flow switch means operatively connected between said capacitor means and a voltage source to charge said capacitor at a predetermined rate upon activation of said flow switch means in response to said fluid flow detecting means;
(3) capacitor discharge means operatively connected between said counting means and said capacitor means to discharge said capacitor upon operation of said counting means to below said predetermined voltage level;
(4) a shut off switch operatively connected to said capacitor means to respond to said shut off signal to shut off flow from said pump.

12. A method of delivering a fluid at a self-service pumping station in a manner to prevent pumping of fluid without an accounting for the fluid pumped, where said station comprises:
(a) a pump to pump fluid from a fluid source;
(b) a nozzle means to receive fluid from said pump;
(c) selectively operable switch means to cause said pump to operate;
(d) counting means responsive to fluid flow and operable to record the same;
said method comprising:
(a) detecting fluid flow to said nozzle;
(b) detecting operation of said counting means;
(c) shutting off said fluid flow under circumstances where fluid flow is detected and there is not detection of operation of said counting means, by charging a capacitor means by connecting said capacitor means to a voltage source upon detection of fluid flow to the nozzle, reducing the charge on the capacitor upon detection of operation of the counting means, under circumstances where said capacitor reaches a predetermined voltage, initiating a shut off signal from said capacitor to shut off fluid flow to said nozzle.

13. An apparatus adapted to deliver fluid, such as liquid fuel, at a self-service station where there is a record made of fluid delivered, and to promptly interrupt delivery of said fluid where the record of fluid delivered is not being made, said apparatus comprising:
(a) a pump to pump fluid from a fluid source;
(b) a nozzle means to receive fluid from said pump;
(c) selectively operable switch means to cause said pump to operate;
(d) counting means responsive to fluid flow and operable to record the same;
(e) flow detecting means to detect fluid flow to said nozzle;
(f) shut off means to cause said apparatus to shut off flow to said nozzle;
(g) a timing device operatively connected to said flow detecting means, to said counting means, and to said shut off means, said timing device having a first inactive mode, a second timing mode during which said timing device is operative through a predetermined timing cycle, and a third shut off mode where, at the end of the timing cycle, a shut off signal is generated to activate said shut off means, said timing device being responsive to the flow detecting means in a manner that upon said flow detecting means detecting flow, said timing device goes from its first mode to its second mode, said timing device being responsive to said counting means to go to its first inactive mode and thus interrupt said timing cycle upon said counting means becoming operative to record the fluid flow.

* * * * *